(12) United States Patent
Schnitter

(10) Patent No.: US 7,341,705 B2
(45) Date of Patent: Mar. 11, 2008

(54) PROCESS FOR PRODUCING NIOBIUM SUBOXIDE

(75) Inventor: Christoph Schnitter, Holle-Sottrum (DE)

(73) Assignee: H.C. Starck GmbH (DE)

( * ) Notice: Subject to any disclaimer, the term of this patent is extended or adjusted under 35 U.S.C. 154(b) by 283 days.

(21) Appl. No.: 10/894,279

(22) Filed: Jul. 19, 2004

(65) Prior Publication Data

US 2005/0019581 A1 Jan. 27, 2005

(30) Foreign Application Priority Data

Jul. 22, 2003 (DE) ............................... 103 33 156

(51) Int. Cl.
*C01G 33/00* (2006.01)
*H01G 9/04* (2006.01)
(52) U.S. Cl. .................................. 423/594.17; 361/528
(58) Field of Classification Search ................. 423/62, 423/594.17; 428/411.1; 419/19, 31; 361/528
See application file for complete search history.

(56) References Cited

U.S. PATENT DOCUMENTS

| 6,180,549 | B1 | 1/2001 | Mazany et al. ............... 502/64 |
| 6,322,912 | B1 | 11/2001 | Fife |
| 6,373,685 | B1 * | 4/2002 | Kimmel et al. ............. 361/508 |
| 6,558,447 | B1 | 5/2003 | Shekhter et al. .............. 72/252 |
| 2003/0104923 | A1 | 6/2003 | Omori et al. ................ 501/134 |
| 2004/0028922 | A1 * | 2/2004 | Reichert et al. ............. 428/469 |

FOREIGN PATENT DOCUMENTS

| WO | 00/15555 | 3/2000 |
| WO | WO 01/99130 | * 12/2001 |

* cited by examiner

*Primary Examiner*—Wayne A. Langel
*Assistant Examiner*—James Fiorito
(74) *Attorney, Agent, or Firm*—Connolly Bove Lodge & Hutz LLP

(57) ABSTRACT

A method is described for preparing a niobium suboxide represented by the formula, $NbO_x$, in which $0.7 < x < 1.3$. The method involves reacting $NbO_y$ (in which $y < 1.8 < 2.1$) with a stoichiometric amount of niobium metal, in the presence of hydrogen. The niobium suboxide produced by such method may be used to fabricate anodes for solid electrolyte capacitors.

11 Claims, No Drawings

PROCESS FOR PRODUCING NIOBIUM SUBOXIDE

CROSS REFERENCE TO RELATED PATENT APPLICATION

The present patent application claims the right of priority under 35 U.S.C. §119 (a)-(d) of German Patent Application No. 103 33 156.5, filed Jul. 22, 2003.

FIELD OF THE INVENTION

The present invention relates to a process for producing niobium suboxide of the approximate composition NbO, the niobium suboxide being suitable in particular for the production of anodes for solid electrolyte capacitors.

BACKGROUND OF THE INVENTION

Solid electrolyte capacitors with a very large active capacitor surface area and therefore a small overall construction suitable for mobile communications electronics used are predominantly capacitors with a niobium or tantalum pentoxide barrier layer applied to a corresponding conductive substrate, utilizing the stability of these compounds ("valve metals"), the relatively high dielectric constants and the fact that the insulating pentoxide layer can be produced with a very uniform layer thickness by electrochemical means. The substrates used are metallic or conductive lower oxide (suboxide) precursors of the corresponding pentoxides. The substrate, which simultaneously forms a capacitor electrode (anode) comprises a highly porous, sponge-like structure which is produced by sintering extremely fine-particle primary structures or secondary structures which are already in sponge-like form. The surface of the substrate structure is electrolytically oxidized ("formed") to produce the pentoxide, with the thickness of the pentoxide layer being determined by the maximum voltage of the electrolytic oxidation ("forming voltage"). The counterelectrode is produced by impregnating the sponge-like structure with manganese nitrate, which is thermally converted into manganese dioxide, or with a liquid precursor of a polymer electrolyte followed by polymerization. The electrical contacts to the electrodes are produced on one side by a tantalum or niobium wire which is sintered in during production of the substrate structure and on the other side by the metallic capacitor sheath, which is insulated with respect to the wire.

The capacitance C of a capacitor is calculated using the following formula:

$$C = (F \cdot \epsilon)/(d \cdot V_F)$$

where F denotes the capacitor surface area, $\epsilon$ the dielectric constant, d the thickness of the insulator layer per V of forming voltage and $V_F$ the forming voltage. Since the dielectric constant $\epsilon$ is 27.6 or 41 for tantalum pentoxide or niobium pentoxide, respectively, but the growth in the layer thickness per volt of forming voltage d is 16.6 or 25 Å/V, both pentoxides have an almost identical quotient $\epsilon/d=1.64$ or 1.69, respectively. Capacitors based on both pentoxides, with the same geometry of the anode structures, therefore have the same capacitance. Trivial differences in details concerning specific weight-related capacitances result from the different densities of Nb, $NbO_x$ (0.7<x<1.3; in particular 0.95<x<1.1) and Ta. Anode structures made from Nb and $NbO_x$ therefore have the advantage of saving weight when used, for example, in mobile telephones, in which every gram of weight saving is a priority. With regard to cost aspects, $NbO_x$ is more favourable than Nb, since some of the volume of the anode structure is provided by oxygen.

The niobium suboxide powders are produced using the standard metallurgical reaction and alloying processes, according to which a mean oxide content is produced by exposing niobium pentoxide and niobium metal, in the presence of hydrogen, to a temperature at which an oxygen concentration balancing takes place, cf. for example WO 00/15555 A1:

$$2Nb_2O_5 + 3Nb \rightarrow 5NbO \qquad (1)$$

The process therefore comprises the use of a high-purity commercially available niobium pentoxide and mixing it with high-purity niobium metal, both in powder form corresponding to the stoichiometric proportions and treating them for several hours at a temperature of from 800 to 1600° C. in a hydrogen-containing atmosphere, which should preferably contain up to 10% of hydrogen. It is preferable for both the pentoxide and the metal to have primary particle sizes which, after the oxygen balancing has taken place, correspond to the desired primary particle size of less than or slightly over 1 µm (smallest) cross-sectional dimension.

In this process, crucibles made from niobium or tantalum which have been filled with a mixture of niobium pentoxide and niobium metal powders are heated to the reaction temperature in a furnace under a hydrogen-containing atmosphere. The niobium metal required for the oxygen exchange with niobium pentoxide is preferably produced by reduction of high-purity niobium pentoxide to form the metal.

This can be effected aluminothermically by igniting an $Nb_2O_5/Al$ mixture and washing out the aluminium oxide which is formed and then purifying the niobium metal ingot by means of electron beams. The niobium metal ingot obtained after reduction and electron beam melting can be embrittled using hydrogen in a known way and milled, producing plateletlike powders.

According to a preferred process for producing the niobium metal in accordance with WO 00/67936 A1, the high-purity niobium pentoxide powder is firstly reduced by means of hydrogen at 1000 to 1600° C. to form the niobium dioxide of approximately the formula $NbO_2$, and is then reduced to the metal using magnesium vapour at 750 to 1100° C. Magnesium oxide which is formed in the process is washed out by means of acids. The latter process is preferred in particular on account of its considerably lower energy demand, on account of the fact that the primary particle size of the niobium pentoxide is in principle maintained and that there is a lower risk of contamination with substances which are harmful to the capacitor properties.

One drawback of the reaction in accordance with reaction Equation (1) is that the volumetric shrinkage of the niobium pentoxide during the transition to the niobium suboxide amounts to approx. 50%, which causes a very loose crystal microstructure of the suboxide which can only be densified by conditioning with a risk of crystal defects being incorporated, and therefore may ultimately have an adverse effect on the capacitor properties. The poor crystal quality of the suboxide is evidently also a reason for its inadequate flow properties.

Good flow properties of the capacitor powders represent a significant process parameter in the production of the capacitors, since the powders are pressed by means of automatic high-speed pressers which are supplied with the powder to be pressed via storage containers. Good flow properties represent a precondition for a defined quantity of powder to flow into the press mould with an accuracy which satisfies modem-day requirements, for example of +/−0.5 mg.

SUMMARY OF THE INVENTION

It is an object of the invention to overcome the drawbacks of the prior art. It is a further object of the invention to provide a niobium suboxide powder with improved flow properties.

A further object of the invention is to reduce the consumption of high-purity magnesium and the production of magnesium oxide, and at the same time to reduce the outlay involved in washing out the magnesium oxide. Furthermore, it is an object of the invention to increase the capacity of the furnaces significantly.

Another object of the invention is to further reduce the risk of contamination during the production of the niobium metal required for the production of niobium suboxide.

In accordance with the present invention, there is provided a method of producing $NbO_x$ comprising:

reacting $NbO_y$, where $1.8<y<2.1$,
with a stoichiometric quantity of niobium metal, in the presence of hydrogen, wherein for $NbO_x$, $0.7<x<1.3$.

DETAILED DESCRIPTION OF THE INVENTION

Accordingly, according to the invention it is proposed that a niobium dioxide of the approximate composition $NbO_2$ be used as starting oxide for the metallurgical oxygen balancing with the niobium metal powder. The niobium dioxide is preferably produced by reduction of niobium pentoxide under flowing hydrogen at a temperature of from 1000 to 1600° C.

The subject matter of the present invention is therefore a process for producing $NbO_x$ where $0.7<x<1.3$, preferably $0.9<x<1.15$, particularly preferably $1<x<1.05$, by reacting $NbO_y$ where $1.8<y<2.1$, preferably $1.9<y<2$, with a stoichiometric quantity of niobium metal in the presence of hydrogen. The temperature and duration of the reaction are to be determined in such a way that the reaction takes place substantially completely.

A further subject of the invention is niobium suboxide powders of the formula $NbO_x$, where $0.7<x<1.3$, preferably $0.9<x<1.15$, particularly preferably $1<x<1.05$, which have ASTM B 213 flow properties of at most 60 s/25 g, preferably at most 50 s/25 g, particularly preferably at most 40 s/25 g.

A reaction temperature of from 900 to 1600° C. is preferred for the process according to the invention. The reaction time can be selected to be between 0.5 and 4 hours, depending on the reaction temperature and the composition and particle structure of the starting substances and the composition of the end product.

The starting niobium dioxide to be used for the process according to the invention is preferably produced by reduction of niobium pentoxide in flowing hydrogen. It is preferable for the reaction to take place at a hydrogen partial pressure of from 50 to 1100 mbar. It can be detected that the reaction has ended when the flowing hydrogen is free of water vapour. After the reaction has ended, it is preferable for the reaction product still to be held for a certain time, for example 0.1 to 0.5 hours, at a temperature of from 900 to 1600° C., preferably from 1200 to 1600° C., in order to stabilize and densify the $NbO_y$ crystal lattice.

Furthermore, it is preferable for the temperature during the reduction of the pentoxide to form the dioxide to be gradually increased from a starting temperature in the range from 950 to 1100° C. to a maximum temperature in the range from 1300 to 1600° C., particularly preferably from a starting temperature in the range from 1000 to 1050° C. to a maximum temperature in the range from 1350 to 1600° C., and then for the reduction to be continued with a gradually decreasing temperature, if appropriate after a certain residence time at the maximum temperature. On account of the decreasing oxygen concentration in the first reduction phase, the reduction rate can be substantially maintained by the increasing temperature, or excessively quick lattice widening as a result of an excessively fast reduction rate can be avoided by using a lower starting temperature. The high final temperature in the range from 1300 to 1600° C. is then held for a certain time, so that the crystal lattice can densify and lattice defects are largely annealed.

On the other hand, it is possible to bring about initially very rapid reduction and therefore very extensive widening of the crystal lattice as early as during production of the dioxide, by means of very rapid heating to a reduction temperature of from 1450 to 1600° C., so that the lattice becomes highly unstable, producing a relatively strong primary particle growth. This may be desirable if a very fine-particle niobium pentoxide is used as starting material, with the intention being to produce capacitors with a medium capacitance in the range from 30 000 to 70 000 µFV/g. In this case too, holding at a temperature of from 1200 to 1600° C. in order to consolidate the dioxide crystal lattice is advantageous.

The reduction times required are dependent on the particle size of the niobium pentoxide used and on the reduction temperature selected. With a pentoxide primary particle size of 0.3 to 0.5 µm, a reduction time of from 20 to 40 minutes is generally sufficient.

On account of the relatively high reduction temperatures (including the maximum temperature in the first case), sintered bridges with an advantageously extremely high strength even in the niobium dioxide are formed.

Further reduction of the dioxide to form the metal by means of magnesium vapour can be carried out at a relatively low temperature, for example 900 to 1100° C. At these low temperatures, only minimal primary grain coarsening occurs. As a result, it is possible for niobium dioxide from a single source on the one hand in part to be reduced further to form the metal and on the other hand to be mixed with the metal without further treatment and then to carry out the oxygen balancing to form the suboxide, since primary grain and agglomerate sizes of dioxide and metal are no different, approximately matching one another in particular after the oxygen balancing.

According to the invention, therefore, the niobium suboxide is produced in accordance with the following formula:

$$NbO_2 + Nb \rightarrow 2NbO \tag{2}$$

The volumetric shrinkage during the transition of the $NbO_2$ to the NbO is just 13%. Although the majority of the volumetric shrinkage of the pentoxide of 42% has been shifted to the production of the $NbO_2$, this has no adverse effect, since it is possible to effect intermediate stabilizing of the crystal microstructure as $NbO_2$ during the hydrogen reduction.

A further advantage is that the magnesium consumption, the washing outlay and the proportion of magnesium oxide which has to be processed for the production of the niobium metal are in each case reduced by 20% by the process according to the invention (based on the final yield of NbO).

A further advantage of the invention is the increase in the capacity of the furnaces for the reaction to form the NbO. Whereas according to reaction Equation (1) the volumetric shrinkage from the starting mixture to the product is 23.5%, according to the reaction equation of the invention there is an increase in volume of (in theory) just 6%, which is practically compensated for by sintering shrinkage. The crucible of the furnace, which according to Equation (1) is initially 100% full, after the reaction has ended is (in theory) only 81% full with NbO.

In the case of the reaction according to the invention corresponding to Equation (2), therefore, the capacity can (theoretically) be increased by (19%/81% =) 23%. In reality, taking the sintering shrinkage into account, the increase in capacity is even greater.

EXAMPLES

Example 1 a) Production of the Niobium Dioxide $NbO_y$

A partially agglomerated, high-purity, spherical niobium pentoxide, which has been sieved through a sieve of mesh width 300 μm, with a primary grain size of approximately 0.7 μm diameter and a specific surface area, determined in accordance with BET (ASTM D 3663), of 2.4 m²/g is used.

The pentoxide is reduced to the niobium dioxide under flowing hydrogen at a temperature which rises over the course of 40 minutes from 950 to 1300° C., is then held at the latter temperature for 30 minutes and then lowered to 1200° C. over the course of 30 minutes and then held for 1 hour at this temperature.

The niobium dioxide had a composition corresponding to the formula $NbO_{2.01}$. The primary grain size had been coarsened to approximately 0.9 μm (determined visually from SEM images), and the BET surface area was 1.1 m²/g.

Measurement of the grain size distribution using a Mastersizer Sμ produced by Malvern (ASTM B 822, wetting agent Daxad 11) after pushing through a sieve of 300 μm mesh width, gave a D10 value of 32 μm, a D50 value of 164 μm and a D90 value of 247 μm.

b) Production of the Niobium Metal

Part of the niobium dioxide obtained under a) was placed, in a reactor, onto a mesh of niobium wire. 1.1 times the stoichiometric quantity of magnesium, based on the oxygen content of the dioxide, was placed beneath the mesh in a crucible. The reactor was purged with argon from the bottom upwards. Then, the reactor was heated to 1050° C. After 8 hours, the reactor was cooled and air was slowly admitted in order to passivate the metal surface.

The niobium metal powder obtained had a primary grain size of 0.85 μm, a BET surface area of 1.32 m²/g and, after being pushed through a sieve with a mesh width of 300 μm, had a D10 value of 33 μm, a D50 value of 176 μm and a D90 value of 263 μm.

c) Production of the Niobium Suboxide $NbO_x$ 43 parts by weight of the niobium powder obtained under b) and 57 parts by weight of the niobium dioxide powder obtained under a) were mixed and introduced into a crucible which was filled up to the brim. The crucible was then heated to 1380° C. over a period of 2.5 hours in a furnace which was purged with a gas mixture comprising 85% by volume of argon and 15% by volume of hydrogen.

After cooling, a niobium suboxide powder corresponding to the formula $NbO_{0.96}$ was obtained. The suboxide powder had a primary grain size of 0.95 μm and a BET surface area of 1.1 m²/g. After sieving through a sieve with mesh width 300 μm, the D10 value was 41 μm, the D50 value was 182 μm and the D90 value was 258 μm.

d) Capacitor Production

In each case 103 mg of the niobium suboxide powder in accordance with c) were introduced into press moulds, so as to surround a niobium contact wire, and then pressed to form pressed bodies with a pressed density of 2.8 g/cm³.

The pressed bodies were sintered standing freely on a niobium platform under high vacuum of $10^{-3}$ Pa for 20 minutes at a temperature of 1450° C. The anodes were formed in an electrolyte comprising 0.1% strength phosphoric acid at a temperature of 85° C. and a forming current of 150 mA up to a forming voltage of 30 V, which was maintained for 2 hours after the current had decayed.

The capacitance and residual current of the anode bodies, which had been provided with a barrier layer of niobium pentoxide by the forming, were measured by the counterelectrode being simulated by an 18% strength sulphuric acid at 25° C. The measurements were carried out at a voltage of 21 V (70% of the forming voltage), a frequency of 120 Hz and a bias voltage of 10 V after a charging time of 3 minutes. The mean specific capacitance was determined as 75 158 μFV/g and the residual current as 0.76 nA/μFV.

Example 2 a) Production of the Niobium Dioxide $NbO_y$:

The starting material used was a partially agglomerated, high-purity, virtually spherical $Nb_2O_5$ after sieving to <300 μm with a specific surface area determined in accordance with BET (ASTM D 3663) of 2.3 m². Part of this $Nb_2O_5$ is reduced to an oxide of the composition $NbO_{2.02}$ under flowing hydrogen at a temperature which rises from 1000° C. to 1450° C. over the course of 60 minutes and is then held at 1450° C. for 200 minutes. The specific surface area of the dioxide was 0.32 m²/g, and the grain size distribution determined by laser diffraction (ASTM B 822) had a D10 value of 67 μm, a D50 value of 176 μm and a D90 value of 284 μm.

b) Production of the Niobium Metal:

Part of the niobium dioxide produced under a) was placed onto a wire mesh in a reactor, and beneath the wire mesh there was a crucible holding 1.2 times the stoichiometric quantity (based on the O content of the niobium dioxide) of magnesium. The reactor was then heated under flowing argon for 4 h to 900° C., during which period the magnesium evaporated and reduced the niobium dioxide above it to the metal. After cooling and passivation, the magnesium oxide formed was removed from the niobium metal formed by washing repeatedly with sulphuric acid followed by water.

The niobium metal powder formed had a primary grain size of from 0.4 to 0.6 μm (determined visually from SEM images), a specific surface area of 3.87 m²/g and a D10 value of 54 µm, determined by laser diffraction (ASTM D 3663, Malvern Mastersizer), a D50 value of 161 µm and a D90 value of 272 µm.

c) Production of the Niobium Suboxides $NbO_x$:
1. Procedure according to the prior art:
Half of the niobium metal produced under b) is mixed with the $Nb_2O_5$ described under a) in a weight ratio of 1:0.95 and then heated in a furnace to 1400° C. for 3 h under a hydrogen partial pressure of 67 mbar absolute. Then, the powder was pushed through a sieve of mesh width 300 µm. The niobium suboxide obtained in this way ("powder A") had a composition $NbO_{1.01}$ and a primary grain size of from 0.95 to 1.1 µm (determined visually from SEM images). The specific surface area was 1.07 m²/g, and the D10 value determined by laser diffraction was 71 µm, the D50 value 165 µm and the D90 value 263 µm.

2. Procedure according to the invention:
The other half of the niobium metal produced under b) is mixed with part of the $NbO_{2.02}$ produced under a) in a weight ratio of 1:1.34 and then heated in a furnace for 2 h under a hydrogen partial pressure of 67 mbar absolute to 1210° C. The niobium suboxide obtained ("Powder B") had a composition $NbO_{0.98}$ and a specific surface area of 1.13 m²/g. The primary grain size, determined visually from SEM images, was on average 1.0 µm, and the grain size distribution determined from laser diffraction resulted in a D10 value of 62 µm, a D50 value of 158 µm and a D90 value of 269 µm. The flow properties of both powders were determined in accordance with ASTM B 213. The following values resulted:

| | |
|---|---|
| Powder A: | 65 s/25 g |
| Powder B: | 26 s/25 g. |

Accordingly, the procedure of the invention leads to niobium suboxides which are distinguished by improved flow properties compared to products obtained conventionally.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A method of producing $NbO_x$ consisting essentially of the sequential steps of A) producing $NbO_y$, wherein 1.8<y<2.1, by reducing niobium pentoxide under flowing hydrogen at a hydrogen partial pressure of 50 to 1100 mbar, the temperature during the reduction of the pentoxide to form the dioxide is to be gradually increased from a starting temperature in the range from 1,000° C. to 1,100° C. to a temperature in the range from 1300° C. to 1600° C. the temperature in the range of 1300° C. to 1600° C. being a maximum temperature, and the $NbO_y$ is held at a temperature of from 900° C. to 1600° C. in order to stabilize and densify the $NbO_y$ lattice and then B) reacting said $NbO_y$ with a stoichiometric quantity of niobium metal, in the presence of hydrogen, wherein for $NbO_x$, 0.7<x<1.3, said.

2. The method of claim 1, wherein the reaction is conducted at a temperature and for a reaction time, said temperature and said reaction time each being independently selected such that the reaction takes place substantially completely.

3. The method of claim 2 wherein the reaction temperature is from 900° C. to 1600° C., and the reaction time is 0.5 to 4 hours.

4. The method of claim 1, wherein the reduction of niobium pentoxide is carried out at a temperature of from 1000 to 1600° C.

5. The method of claim 4 wherein the product $NbO_y$ has a crystal lattice, and after the reduction of niobium pentoxide in flowing hydrogen is completed product $NbO_y$ is held at a temperature of from 900 to 1600° C. in order to stabilize and densify the crystal lattice of the product $NbO_y$.

6. The method of claim 5 wherein the niobium pentoxide is in the form of a powder comprising agglomerates of niobium pentoxide, the agglomerates comprising primary particles of niobium pentoxide having a mean minimum particle size of 0.4 to 2 µm.

7. The method of claim 1, wherein the niobium metal is a niobium metal powder which has been formed by reduction of $NbO_y$ with magnesium vapour, the $NbO_y$, that is reduced with magnesium vapour, is formed by reducing niobium pentoxide in flowing hydrogen.

8. The method of claim 7 wherein the reduction of the $NbO_y$ in magnesium vapour is conducted at a temperature of from 750 to 1150° C.

9. The method as claimed in claim 1, wherein x is between 0.9 and 1.15.

10. The method as claimed in claim 1, wherein x is between 1 and 1.05.

11. The method as claimed in claim 1, wherein y is between 1.9 and 2.

* * * * *